May 16, 1950  H. C. MAY  2,508,181
CONTROL VALVE MECHANISM
Filed July 19, 1946  2 Sheets-Sheet 1

INVENTOR.
Harry C. May
BY Frank E. Miller
ATTORNEY

May 16, 1950  H. C. MAY  2,508,181
CONTROL VALVE MECHANISM
Filed July 19, 1946  2 Sheets-Sheet 2

INVENTOR.
Harry C. May
BY Frank E. Miller
ATTORNEY

Patented May 16, 1950

2,508,181

UNITED STATES PATENT OFFICE 2,508,181

CONTROL VALVE MECHANISM

Harry C. May, East McKeesport, Pa., assignor to The Westinghouse Air Brake Company, Wilmerding, Pa., a corporation of Pennsylvania Application July 19, 1946, Serial No. 684,984

10 Claims. (Cl. 74—483)

This invention relates to control devices and more particularly to the manually operated type for selectively controlling a plurality of operations.

One object of the invention is to provide an improved control device of the above mentioned type requiring relatively light operating forces for prompt and positive operation.

Another object of the invention is the provision of an improved control device of the above type embodying a plurality of individual, selectively operative operators, such as manually operative push buttons, and automatic means for locking each of said operators in an operating position and releasable by operation of another operator.

Other objects and advantages will be apparent from the following more detailed description of the invention.

Figure 1:
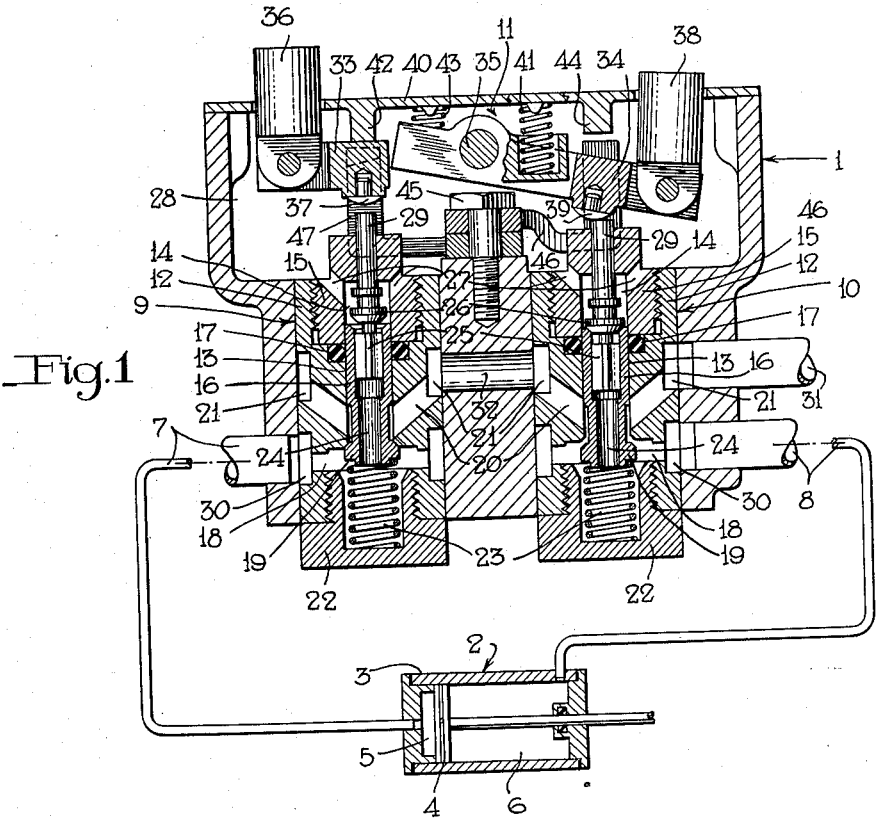
Figure 2:
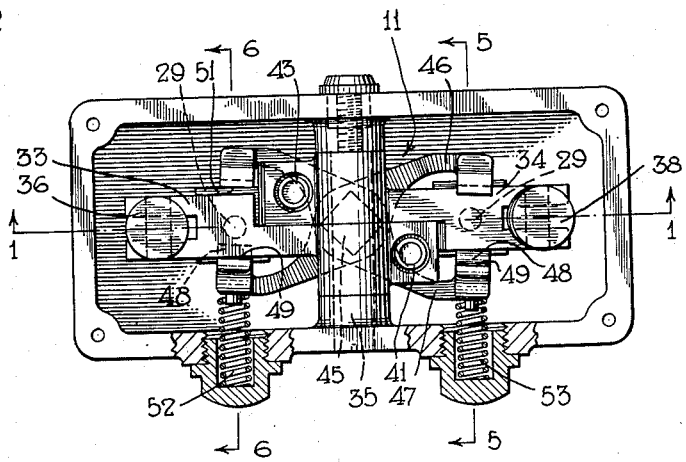
Figure 3:
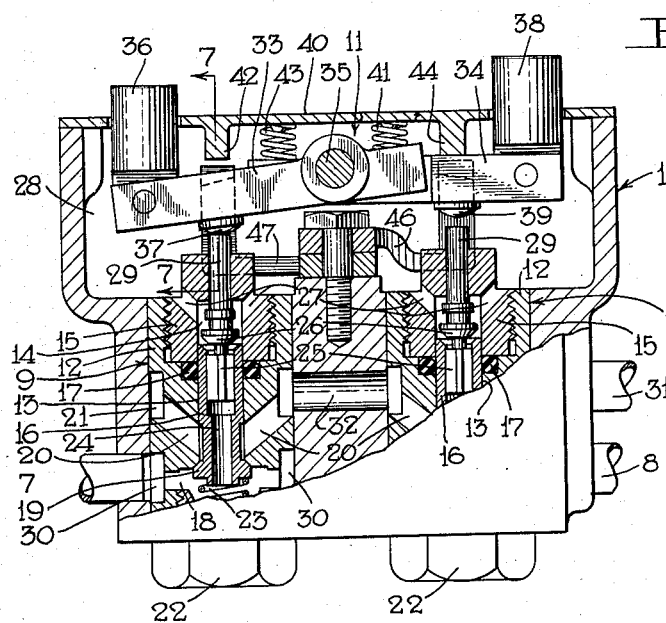
Figure 7:
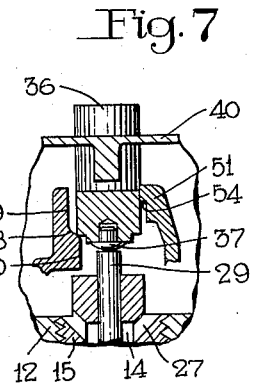
Figure 4:
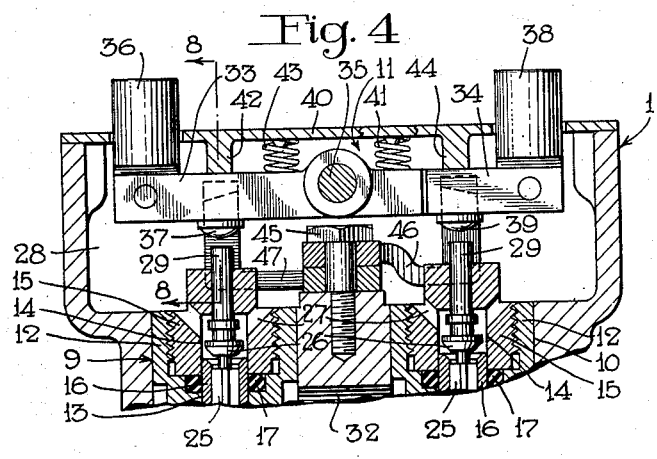
Figure 8:
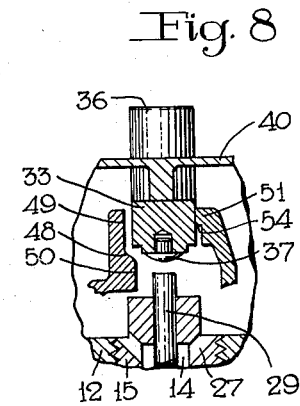
Figure 5:
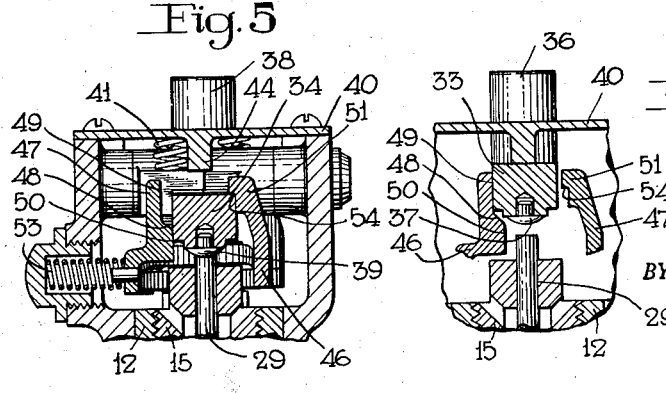
Figure 6:
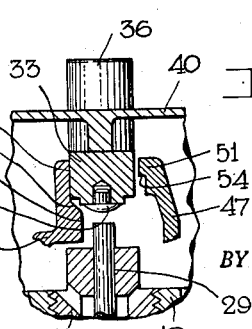

In the accompanying drawings; Fig. 1 is a diagrammatic view of a fluid pressure control system embodying, in vertical section taken on line 1—1 in Fig. 2, a control device constructed in accordance with one embodiment of the invention; Fig. 2 is a plan view, partly in section, of the control device shown in Fig. 1 but with a cover removed; Fig. 3 is a vertical sectional view of a portion of the control device shown in Fig. 1 but with certain parts in a different position; Fig. 4 is a view similar to Figs. 1 and 3 but showing certain parts in a still different position; Fig. 5 is a fragmentary sectional view taken on the line 5—5 of Fig. 2; Fig. 6 is a fragmentary sectional view taken on the line 6—6 of Fig. 2; Fig. 7 is a sectional view taken on the line 7—7 of Fig. 3; and Fig. 8 is a sectional view taken on the line 8—8 of Fig. 4.

Description

As shown in the drawings, a control device 1, embodying the invention, may for the purpose of illustrating one use of said invention, be arranged to control a double acting fluid pressure motor 2.

The double acting fluid pressure motor 2 comprises a cylinder 3 and a piston 4 adapted for reciprocation within said cylinder. The piston 4 divides cylinder 3 into two chambers 5 and 6 connected by pipes 7 and 8, respectively, to the control device 1.

The control device 1 comprises a body portion containing two valve mechanisms 9 and 10 and an operating mechanism 11 for controlling operation of said valve mechanisms. The two valve mechanisms 9 and 10, which are identical in construction and which are arranged in spaced apart parallel relation, each comprises a sleeve 12 pressed into a bore in the body portion of the control device. The sleeve 12 has a bore 13 which is coextensive with a counterbore 14 formed in a member 15 secured in one end of the sleeve by screwthreaded engagement. Slidably mounted in these bores is a valve member 16, the peripheral surface of which is in sealing and sliding contact with a gasket ring 17 clamped between the sleeve 12 and the member 15. The valve member 16 extends into a chamber 18 wherein a valve 19 is provided on the end of the said member for cooperation with a seat on sleeve 12 to control communication between said chamber and one or more ports 20 in the sleeve leading to an annular recess 21 provided around said sleeve. The outer end wall of chamber 18 is closed by a cap 22 having screwthreaded engagement with sleeve 12, and supported by said cap and bearing against said valve is a spring 23 for urging the valve 19 to its seated position.

The valve member 16 is provided with an axial bore 24 open at one end to chamber 18 and open at the opposite end to a bore of larger diameter in which there is slidably mounted a fluted stem 25 projecting from a release valve 26. The release valve 26 is contained in the counter-bore 14 above the upper end of the valve member 16, which member is provided with a seat for engagement by said valve. The portion of the counter-bore 14 containing the release valve 26 is open to atmosphere through one or more passages 27 and a chamber 28. The release valve 26 is provided with a stem 29 which extends through a bore in member 15 into chamber 28.

In the valve mechanism 9 an annular recess 30 encircling sleeve 12 is open to chamber 18 and to pipe 7, while in valve mechanism 10 a corresponding recess 30 is open to the corresponding chamber 18 and to pipe 8. A fluid pressure supply pipe 31 is connected to annular recess 21 in valve mechanism 10 and said annular recess is connected by a passage 32 to the corresponding annular recess 21 in the valve mechanism 9.

The operating mechanism 11 comprises two substantially alike but oppositely arranged operating levers 33 and 34 contained in chamber 28 and fulcrumed intermediate their ends on a pin 35 carried in the body at right angles to the axis of the valve mechanisms 9 and 10. A push button 36 is pivotally connected to one end of operating lever 33, while between said push button and pin 35 said lever is provided with a button 37 for contacting the end of the release valve stem 29 in the valve mechanism 9. A push button 38 is pivotally connected to one end of operating lever 34, while between said push button and pin 35 said lever is provided with a button 39 for contacting the end of the release valve stem 29 in the valve mechanism 10. The chamber 28 is closed by a cover 40 having bores through which the two push buttons 36 and 38 slidably extend to the exterior of the cover for manual operation. The opposite end of lever 33 has a pocket in which is disposed one end of a spring 41 the other end of which bears against the cover 40. This spring is under compression for urging the button 36 outwardly of cover 40 and the operating lever 33 into engagement with a stop 42 formed on said cover. A similar spring 43 is interposed between lever 34 and cover 40 for urging the button 38 outwardly of cover 40 and said lever into engagement with a stop 44.

Secured in the body between the two release valve stems 29 of the valve mechanisms 9 and 10 is a fulcrum pin 45, disposed with its axis parallel to said stems, and rockably mounted on this pin, transversely of the operating levers 33 and 34, are two substantially alike locking members 46 and 47. The two locking members cross each other and their ends at one side of fulcrum pin 45 are disposed at opposite sides of lever 33, while their opposite ends are disposed at opposite sides of lever 34.

One end of each of the locking members 46 and 47 is provided on the side adjacent one of the operating levers 33 or 34 with a sloping cam surface 48 (Figs. 5 to 8) connecting two vertical surfaces 49 and 50, while at the opposite end on the side adjacent the other operating lever is a hook or undercut part 51 having a surface 54 for overlying and engaging a surface of said other lever opposite the respective valve mechanism 9 or 10.

The two locking members 46 and 47 are so designed that with surface 49 on either locking member in contact with the side of the respective lever 33 or 34, the under-cut hook-like part 51 on the opposite end of said member will overlie the surface of the other lever opposite the valve mechanism 9 or 10, while with surface 50 on said locking member in contact with the side of the respective lever, said under-cut hook-like part 51 will be displaced out of the path of movement of said other lever. Movement of either operating lever 33 or 34 against the cam surface 48 of the respective locking member will rock said locking member in a direction to disengage the under-cut hook-like part 51 on the opposite end from the other lever. Springs 52 and 53 act on the locking members 46 and 47 respectively for maintaining the ends having the cam surfaces 48 in engagement with the respective operating levers.

Operation

With the various parts of the control mechanism in a normal position as shown in Figs. 1 and 2 of the drawing, and with pipe 31 supplied with fluid under pressure, chamber 6 of the double acting fluid pressure motor 2 will be charged with fluid under pressure from said pipe by way of the valve mechanism 10, while chamber 5 will be open to atmosphere, in a manner which will become apparent from the description to follow. The piston 4 will therefore occupy the position in which it is shown in the drawing.

If it is desired to move piston 4 to the opposite or right hand end of cylinder 3, the operator will press the push button 36 downwardly with his finger and rock the operating lever 33 counterclockwise about the pin 35. As operating lever 33 moves downward the lower left edge of this lever, as viewed in Fig. 6, will slide along surface 49 of the locking member 46 until this edge comes in contact with cam surface 48. Further downward movement of the operating lever 33 will then cause the lower edge thereof to slide along the cam surface 48 which will cause counterclockwise rocking of the locking member 46 about fulcrum pin 45 to move the under-cut hook-like part 51 at the opposite end of said locking member out of the path of movement of the operating lever 34, whereupon, spring 43 will rock operating lever 34 counterclockwise until it comes in contact with the stop 44.

As the operating lever 34 is rocked counterclockwise by spring 43, as just described, the button 39 will be moved in a direction away from stem 29 of the release valve 26 of the valve mechanism 10, whereupon, in said mechanism spring 23 will move the valve member 16 upwardly to seat the valve 19 for preventing further flow of fluid under pressure to chamber 6 of the double acting fluid pressure motor 2. After the valve 19 in valve mechanism 10 seats the fluid under pressure from chamber 18 acting thru bore 24 on the release valve 26 in said mechanism will move said release valve from its seat to permit release of fluid under pressure from the motor piston chamber 6 thru pipe 8 and thence to atmosphere thru chamber 18, bore 24, passages 27, chamber 28 and clearance space provided in the cover 40 around the push buttons 36 and 38. The parts of the control device will now occupy the position in which they are shown in Figs. 3 and 7 of the drawing.

After the hook-like part 51 on member 46 has been moved out of the path of movement of the operating lever 34 to permit operation of valve mechanism 10 to open chamber 6 in motor 2 to atmosphere as above described, further depression of button 36 will move button 37 into contact with stem 29 of the release valve 26 of the valve mechanism 9 and move said release valve into seating engagement with the valve member 16 for closing communication between atmosphere and chamber 5 of the double acting fluid pressure motor 2. Further depressing button 36 and rocking of operating lever 33 will then actuate the release valve 26 and valve member 16 in valve mechanism 9 to unseat the respective valve 19 and permit fluid under pressure to flow from the supply pipe 31 to chamber 5 of the double acting fluid pressure motor 2, by way of the annular recess 21 in the valve mechanism 10, passage 32, and thence thru the annular recess 21, ports 20, past the unseated valve 19, and thru chamber 18 in the valve mechanism 9.

With fluid under pressure released from chamber 6 the fluid thus supplied to chamber 5 in the fluid motor 2 will then move piston 4 to the right hand end of cylinder 3.

When the operating lever 33 has been rocked counterclockwise by depressing button 36 sufficiently to bring the top of said lever below the hook-like part 51 of the locking member 47 the spring 53 bearing against said locking member will rock it counterclockwise, as viewed in Fig. 2 to move said hook-like part 51 into the path of return movement of said lever. If the operator's finger is now removed from the push button 36, spring 41 will move the operating lever 33 into contact with surface 54 on the hook-like portion 51 of locking member 47 to hold said lever against return to its normal position against stop 42 and the valve mechanism 9 will therefore be maintained in the condition for supplying fluid under pressure to chamber 5 of the double acting fluid pressure motor 2.

If the operator desires to effect movement of piston 4 of the double acting fluid pressure motor 2 from the right hand end to the left hand end of cylinder 3 he will depress the push button 38 to rock the operating lever 34 clockwise about pin 35. As the operating lever 34 is thus moved downwardly the lower left edge of this lever, as viewed in Fig. 5 of the drawing, will slide along surface 49 of the locking member 47 until this edge comes in contact with cam surface 48. Further downward movement of operating lever 34 will then cause the lower edge thereof to slide along the cam surface 48 and rock the locking member 47 in a clockwise direction, as viewed in Fig. 2, about fulcrum pin 45 to move the under-cut hook-like part 51 at the opposite end out of the path of movement of the operating lever 33, whereupon spring 41 will rock operating lever 33 clockwise until it comes in contact with the stop 42. As the operating lever 33 is thus rocked clockwise the button 37 will be moved in a direction away from stem 29 of the release valve 26 in the valve mechanism 9 to permit operation of said mechanism to first cut off the supply of fluid under pressure from pipe 31 to chamber 5 in the fluid motor 2 and to then release fluid under pressure from said chamber in a manner which will be apparent from the above description of operation of the valve mechanism 10.

As the push button 38 is then further depressed, the operating lever 34 will be rocked further in a clockwise direction to first bring the button 39 into contact with stem 29 of the release valve 26 of the valve mechanism 10, and to then seat said release valve and to open the respective supply valve 19, for thereby closing communication between atmosphere and chamber 6 of the double acting fluid pressure motor 2 and for permitting fluid under pressure to flow from the supply pipe 31 to said chamber.

With chamber 5 in the fluid motor 2 thus open to atmosphere the pressure of the fluid provided in chamber 6 will move piston 4 to the left hand end of cylinder 3.

When the operating lever 34 has been rocked by push button 38 clockwise sufficiently to bring the top of said lever below the surface 54 on the hook-like part 51 of the locking member 46, the spring 52 bearing against said locking member will rock it clockwise, as viewed in Fig. 2, to move the part 51 into the path of return movement of said lever, as shown in Fig. 5. If the operator's finger is now removed from the push button 38 the operating lever 34 will be held in the depressed position to maintain the valve mechanism 10 in the position for supplying fluid under pressue to chamber 6 of the double acting fluid pressure motor 2.

If it is desired to again release the fluid under pressure from chamber 6 and to supply fluid under pressure to chamber 5 of the double acting fluid pressure motor 2, the push button 36 may be manually depressed by the operator to first operate the locking member 46 out of locking relation with lever 34 to permit operation of the valve mechanism 10 to release fluid under pressure from chamber 6, followed by operation of valve mechanism 9 to supply fluid under pressure to chamber 5 and then automatic operation of the locking member 47 to hold the lever 33 in the depressed position for maintaining the valve mechanism 9 in the condition for supplying fluid under pressure to chamber 5.

Under certain conditions it may be desirable to open both chambers 5 and 6 in the fluid motor 2 to atmosphere at the same time, and this may be accomplished as follows.

Assume that chamber 6 is charged with fluid under pressure by way of the open supply valve 19 in the valve mechanism 10 and that chamber 5 is open to atmosphere past the release valve 26 in the valve mechanism 9 and that it is desired to release the fluid under pressure from chamber 6 and to at the same time maintain chamber 5 open to atmosphere. To accomplish this the operator will depress push button 36 only sufficient to operate lever 33 to move the locking member 46 out of interlocking relation with lever 34 whereupon the latter lever will be returned to its normal position by spring 43 to permit operation of valve mechanism 10 to open chamber 6 in the fluid motor 2 to atmosphere. As the lever 34 is thus returned to its normal position spring 53 acting on locking member 47 will rock the opposite end of said locking member into contact with lever 33, but with the lever 33 only depressed sufficiently to release locking member 47 from lever 34, the surface 54 on locking member 46 will be below the top surface of lever 33 so that button 36 may then be released and lever 33 will be returned by spring 41 to its normal position thus permitting the valve mechanism 9 to maintain chamber 5 open to atmosphere.

If chamber 5 is charged with fluid under pressure and it is desired to release such fluid under pressure without supplying fluid under pressure to chamber 6, this may be accomplished by depressing button 38 only sufficient to release locking member 47 from lever 33 and then releasing button 38, as will be apparent from the above description.

*Summary*

It will now be seen that, at the will of the operator, fluid under pressure may be admitted to either of the chambers 5 and 6 and released from the other by depression of either one or the other of the push buttons 36 and 38, and that, due to the automatic operation of the respective locking member 46 or 47, the fluid pressure will be maintained in the respective chamber 5 or 6 upon removal of pressure on the respective button 36 or 38, and until the other button is depressed to cause a supply of fluid under pressure to the other one of said chambers, whereupon the respective locking member will be automatically operated to permit operation of the valve mechanism controlling the pressure of fluid in the chamber last charged, to release such fluid under pressure. Further, when either button 36 or 38 is fully depressed and in a locked condition, it may be released without causing locking of the other button in a depressed position, if such is desired, for opening both chambers 5 and 6 to atmosphere at the same time.

Having now described the invention what I claim as new and desire to secure by Letters Patent is:

1. A control device comprising a pair of parallel arranged manually movable members each having a normal position and a depressed position, a pair of locking levers disposed to turn in a direction at right angles to the direction of movement of said movable members and each automatically operative to hold one of said members in its depressed position and rendered ineffective by the other member upon movement toward its depressed position, and means for moving each of said members from its depressed position to its normal position upon rendering the respective lever ineffective.

2. A control device comprising a pair of parallel arranged manually movable members each having a normal position and a depressed position, a pair of locking levers disposed to turn in a direction at right angles to the direction of movement of said movable members and each for holding one of said members in its depressed position, means for rendering each of said locking levers effective upon movement of the respective member to its depressed position, means operative by each member upon movement thereof out of its normal position to render said locking lever for the other member ineffective, and means for moving said members to their normal position upon rendering the respective locking mechanisms ineffective.

3. A manually operative control device comprising a casing, two actuating levers fulcrumed in said casing, each lever having a normal position and being movable to another position, a locking lever, for each actuating lever, fulcrumed in said casing, each locking lever comprising locking means movable into interlocking relation with the respective actuating lever when in its other position to hold the respective actuating lever in its said other position, and cam means operative by the other actuating lever upon movement thereof out of its normal position to move said locking means out of interlocking relation with the respective actuating lever, and means for moving each actuating lever to its normal position upon movement of the respective locking means out of interlocking relation therewith.

4. A manually operative control device comprising a casing, two actuating levers fulcrumed in said casing, each lever having a normal position and being movable to another position, a locking lever, for each actuating lever, fulcrumed intermediate its ends in said casing, each locking lever comprising at one end a hook for overlying the respective actuating lever in its said other position for holding the respective actuating lever against movement from its said other position, a spring acting on each locking lever for moving the respective hook into overlying relation with the respective actuating lever upon movement to its said other position, each locking lever comprising at the opposite end cam means operable by the other actuating lever upon movement out of its normal position to move the respective hook out of the path of movement of the respective actuating lever, and means for moving said actuating levers to their normal position upon movement of the respective hooks out of the path of movement of the respective levers.

5. A manually operative control device comprising a casing, two actuating levers fulcrumed in said casing, each lever having a normal position and another position, a push button connected to each of said levers for moving it to its said other position, a locking element for each of said levers comprising locking means automatically cooperative with the respective lever in its said other position to hold said lever therein, each locking element also comprising means operable by the other lever upon movement from its normal position to a position intermediate its normal and other positions to render the respective locking means ineffective, and means for moving said actuating levers to their normal positions upon rendering the respective locking means ineffective.

6. A manually operated control device comprising a pair of operating levers, two releasable locking means, one for locking each of said operating levers in a chosen position, means operative by either of said operating levers upon an initial movement toward its said chosen position for releasing from the other operating lever the respective locking means, and means operative upon movement of either operating lever to its chosen position to effect operation of the respective locking means into interlocking relationship therewith.

7. In a manually operated control device, the combination with a pair of rockable levers, a push button for rocking each of said rockable levers from a normal position to another position, a pair of locking levers, one for each of said rockable levers, means operative upon movement of each of said rockable levers to its said other position to move the respective locking lever into interlocking relation therewith, means operative upon movement of either rockable lever from its normal position to release from the other rockable lever the respective locking means, and means for rocking each of said rockable levers from its said other position to its said normal position.

8. A manually operated control device comprising a pair of operating levers operable to be rocked from a normal position to a depressed position, a pair of locking levers, one for each of said operating levers, and each of said locking levers comprising a hook operable to lock the respective operating lever in its depressed position, means operable by the other operating lever upon movement to a position intermediate its normal and depressed positions for moving said hook out of interlocking relationship with the respective operating lever, and means operable to move said operating levers from their depressed position to their normal position.

9. A manually operated control device comprising a casing, a shaft journaled in said casing, a pair of operating levers fulcrumed on said shaft and rockable about said shaft from a normal position to a depressed position, a locking mechanism comprising two locking levers, one for each operating lever, each of said locking levers comprising a hook for locking the respective operating levers in its depressed position, and cam means operable by the other operating lever upon rocking to a position intermediate its normal position and its depressed position to unlock said hook from the respective operating lever, and means for moving said operating levers to their said normal position.

10. A manually operated control device comprising, a fulcrum means, a pair of operating levers rockable on said fulcrum means from a normal position to a depressed position, a second fulcrum means, a locking mechanism comprising two locking levers, one for each operating lever, and rockable on said second fulcrum means from a released position to a locking position, the axes of said second fulcrum means and the first named fulcrum means being at right angles one to the other, the locking lever for each operating lever comprising a hook movable into interlocking relation with the respective operating lever in the depressed position thereof for holding the respective operating lever in its depressed position, and further comprising cam means operable by the other operating lever upon movement out of its normal position to unlock said hook from the respective operating lever, and means for moving said operating levers to their normal position.

HARRY C. MAY.

REFERENCES CITED

The following references are of record in the file of this patent:

UNITED STATES PATENTS

| Number | Name | Date |
|---|---|---|
| 836,994 | Rider | Nov. 27, 1906 |
| 1,014,069 | Lambert | Jan. 9, 1912 |
| 1,232,793 | Grimes | July 10, 1917 |
| 1,233,548 | Bungay | July 17, 1917 |
| 1,979,588 | Vreeland | Nov. 6, 1934 |
| 2,009,536 | Warg | July 30, 1935 |
| 2,038,883 | Calarco | Apr. 28, 1936 |
| 2,192,621 | Radtke | Mar. 5, 1940 |
| 2,231,365 | Matthews et al. | Feb. 11, 1941 |
| 2,289,513 | Mastney | July 14, 1942 |
| 2,311,322 | Zimmerman et al. | Feb. 16, 1943 |